(12) United States Patent
Weiand

(10) Patent No.: US 7,419,048 B2
(45) Date of Patent: Sep. 2, 2008

(54) TRANSVERSE CONVEYING SCREW FOR A HARVESTING FRONT ATTACHMENT

(75) Inventor: Norbert Weiand, Stadtlohn (DE)

(73) Assignee: Maschinenfabrik Kemper GmbH & Co. KG, Stadtlohn (DE)

( * ) Notice: Subject to any disclaimer, the term of this patent is extended or adjusted under 35 U.S.C. 154(b) by 536 days.

(21) Appl. No.: 11/176,082

(22) Filed: Jul. 7, 2005

(65) Prior Publication Data

US 2006/0005523 A1   Jan. 12, 2006

(30) Foreign Application Priority Data

Jul. 8, 2004  (DE) ....................... 10 2004 033 089

(51) Int. Cl.
*A01D 45/02* (2006.01)
(52) U.S. Cl. ............................. 198/662; 198/677; 56/95
(58) Field of Classification Search ................. 198/660, 198/662, 666, 677; 460/114; 56/95, DIG. 5; 222/412
See application file for complete search history.

(56) References Cited

U.S. PATENT DOCUMENTS

| | | | |
|---|---|---|---|
| 3,244,271 A | 4/1966 | Wenning | |
| 4,180,155 A * | 12/1979 | Stevick | 198/498 |
| 4,641,743 A * | 2/1987 | Kemp, Jr. | 198/666 |
| 4,881,920 A | 11/1989 | Heidjann | |
| 5,356,054 A * | 10/1994 | Loppoli et al. | 222/610 |
| 5,439,182 A * | 8/1995 | Sgariboldi | 241/260.1 |
| 5,443,588 A * | 8/1995 | Loppoli | 414/526 |
| 5,732,892 A * | 3/1998 | Neier | 241/30 |
| 5,784,869 A * | 7/1998 | Rayfield | 56/119 |
| 5,961,212 A * | 10/1999 | Haegeman | 366/266 |

FOREIGN PATENT DOCUMENTS

| | | |
|---|---|---|
| DE | 38 04 598 | 2/1988 |
| DE | 41 09 064 | 3/1991 |
| DE | 199 39 168 | 8/1999 |
| DE | 103 54 977 | 6/2005 |
| EP | 0 557 702 | 9/1993 |
| WO | WO 93/06491 | 8/1992 |
| WO | WO 02/19793 | 3/2002 |

OTHER PUBLICATIONS

German Search Report, Feb. 9, 2007, 4 Pages.

* cited by examiner

*Primary Examiner*—Douglas A Hess

(57) ABSTRACT

A transverse conveying screw for a harvesting front attachment. The tranverse conveying screw includes a body, screw elements disposed around the body adapted to convey material from the outer ends of the body toward the center of the body, and a ring-shaped terminal disc disposed between the screw elements. The terminal disc lies in a plane oriented at an angle, $\alpha$, with respect to a plane extending orthogonally to the longitudinal axis of the body.

6 Claims, 4 Drawing Sheets

TRANSVERSE CONVEYING SCREW FOR A HARVESTING FRONT ATTACHMENT

BACKGROUND

1. Field of the Invention

The invention generally relates to a transverse conveying screw for a harvesting front attachment.

2. Related Technology

In the harvesting of crop materials using agricultural harvesting machines, as a rule the crop material is first lifted from the ground on the field (e.g. with the prongs of a pick-up) or alternatively is cut off (e.g. by the cutting members of a cutting apparatus or by mowing and intake apparatus in a "corn biter", or by the intake and plucking mechanism of a "corn plucker"). The crop, or the parts thereof that are to be picked (e.g. ears of corn), is/are then conveyed transversely and delivered to the intake channel or inclined conveyor of the harvesting machine. In many harvesting front attachments, the transverse conveying is accomplished by a transverse conveying screw.

Typically, a transverse conveying screw is comprised of a circular cylindrical tube and spiral screw elements disposed around the periphery of the tube, the latter serve to convey the crop material. The spiral screw elements extend, in their spiral course, inward from the two respective sides and terminate in the central region of the transverse conveying screw, ahead of the intake channel of the harvester. The screw elements adjoin terminal discs, the peripheries of which are partially formed by a circular arc around the screw axis. Downstream of the circular arc, the radius of the terminal disc diminishes spirally, so as to sharply come to an end. Between the terminal discs, axially and radially extending conveying vanes extend, for conveying the crop materials rearward.

In other prior art transverse conveying screws, circular terminal discs that extend radially have been seen. Terminal discs of the prior art also have been provided with an incline, i.e. they extend in the axial direction of the transverse conveying screw. They successively narrow as they extend inwardly, and have a wave-shaped periphery.

The task performed by the transverse conveying screws is to deliver the crop material in a maximally uniform manner over the width of the intake channel, so that the harvesting machine is laterally loaded as uniformly as possible. This uniformity is particularly important in conventional thresher harvesters having straw vibrators, because more highly loaded vibrators generate greater losses than less highly loaded vibrators. Uniform feed over the width is also important in baling presses, for the sake of homogeneity of the bales.

The transverse conveying screws having terminal discs that extend generally radially take the crop material, which is conveyed by the screw elements to the terminal discs, and generally deliver it rearward. Any conveying elements disposed between the terminal discs essentially convey rearward only the crop material which is presented in the region of their lateral extent. As a result, the intake channel of the harvesting machine often will receive more crop material in its outer regions than its inner regions. Inclined terminal discs provide a certain lateral distribution of the crop material which it delivers, but its contribution is insubstantial, because of the relatively small dimensions of the terminal discs.

The underlying problem of the present invention was to devise a transverse conveying screw wherein the magnitude of the described problems is reduced.

SUMMARY OF THE INVENTION

The transverse conveying screw of the present invention is comprised of a body, and screw elements disposed around the body. From each of the two outer sides of the body, at least one such screw element runs toward the center of the body. In the center of the body a terminal disc is disposed which forms a closed ring and lies in a plane which forms an angle, particularly an acute angle, with the radial plane of the body. Accordingly, when the body is rotated the terminal disc executes a wobbling movement (in the nature of a swash plate).

The ring shape of the terminal disc prevents crop material in the region of the intake channel of the harvesting machine from passing to the laterally opposite side of the transverse conveying screw. The wobbling movement of the terminal disc prevents the development of a dead region where no crop material is conveyed (such a dead region occurs when a radially extending terminal disc is employed). The wobbling movement also favors movement of crop in the direction of the intake channel of the harvesting machine, thus reducing losses of material, e.g. losses of ears of corn.

Preferably only one terminal disc is disposed in the center of the body, and its orientation is nearly transverse to the longitudinal axis of the body. This disc is thus disposed centrally ahead of the intake channel of the harvesting machine, and serves to avoid material buildup (excess accumulation) in the center of the intake channel because the materials on the left and right sides of the intake channel are separately conveyed. The crop material accumulates laterally of the central terminal disc, whereby substantial proportions of the material are delivered to the intake channel of the harvesting machine at locations which are at appreciable distances from the terminal disc. Therefore the feed of the harvesting machine is improved. The terminal disc also prevents lodging of material at the ends of the screw elements.

The terminal disc is preferably elliptical, but numerous other variant configurations of its periphery are conceivable. The disc may be or become smaller or larger beginning at the transition locus from the screw elements; or it may be wave-shaped.

The two screw elements extending from the outer sides may end at the terminal disc, and may be connected to the terminal disc. Alternatively, they may end ahead of the terminal disc, wherewith their terminal edge may be oriented radially with respect to the body or may continuously taper off. If the screw elements end at a distance from the terminal disc, it is possible to have a region free of screw elements in the center of the body between the screw elements and the terminal disc. Alternatively, in this region one may provide axial vanes, which may indeed be extensions of the screw elements. Preferably such axial vanes extend radially with respect to the body.

The transverse conveying screw of the present invention is suitable for all harvester front attachments and harvesting machines which receive crop material in one direction. Examples are pick-ups for baling presses, field choppers, loaders, cutters, corn pluckers for thresher harvesters, and corn biters for field choppers.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
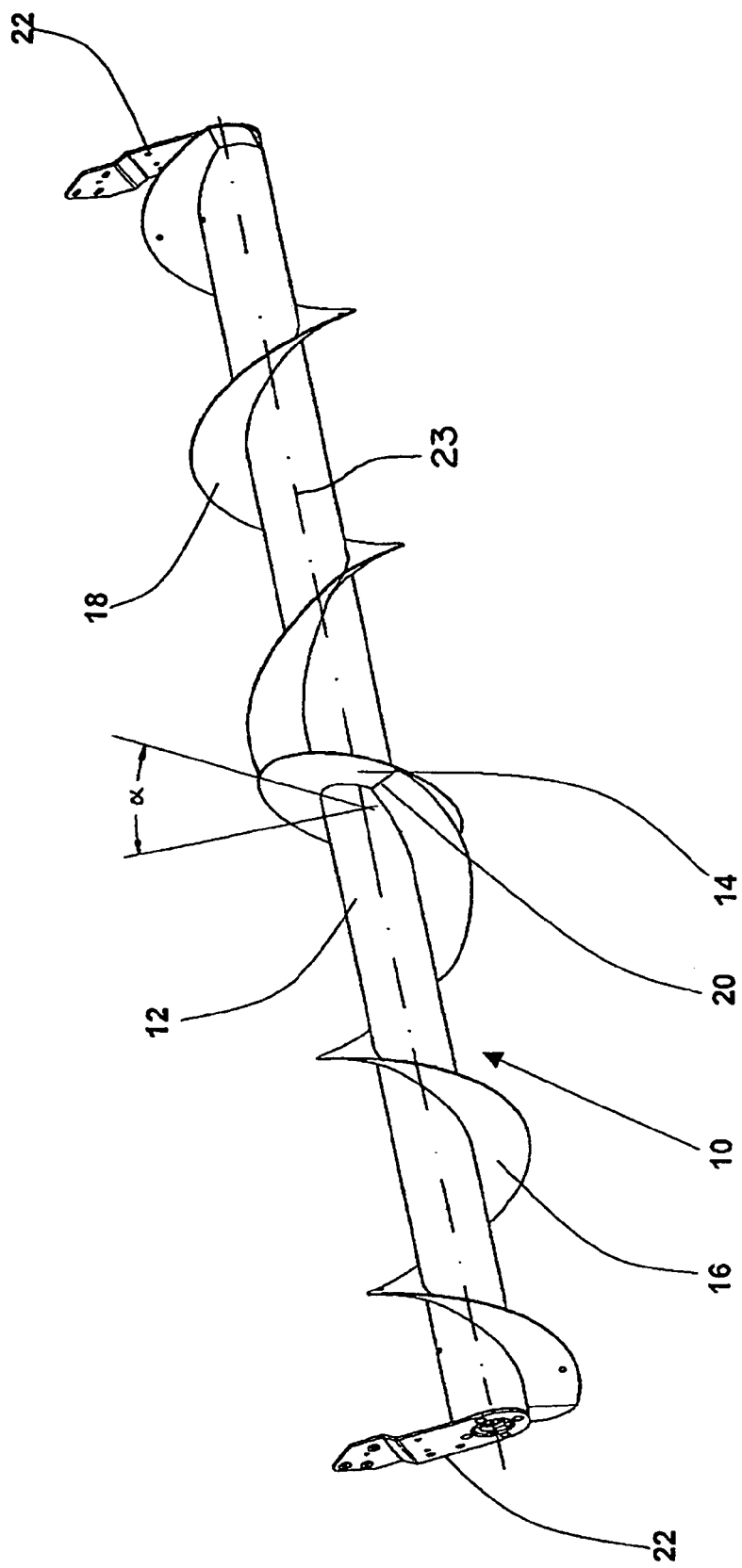
FIG. 1 is a perspective view of a transverse conveying screw of the present invention.

The transverse conveying screw 10, shown diagrammatically in FIG. 1, is comprised of a circular cylindrical tubular body 12, a central ring-shaped terminal disc 14, and two spiral screw elements 16, 18, which extend spirally from respective outer ends of the screw 10 to the terminal disc 14 in the center of the body 12. The screw elements 16, 18 each adjoin the terminal disc 14 at an edge 20, which extends approximately radially to the body 12, and are joined there to the disc 14 by respective continuous weld seams. The effective outer diameter of the screw elements 16, 18 is constant over the length of the body 12 and is slightly less than the effective outer diameter of the terminal disc 14. In an alternative embodiment, the effective diameter of the terminal disc 14 may be the same as that of the screw elements 16, 18 or may be slightly less than that of the screw elements 16, 18. At the ends of the body 12, brackets or holding means 22 are provided, for attaching the transverse conveying screw 10 to the frame of a harvesting front attachment.

The terminal disc 14 lies in a plane oriented at an angle, α (alpha), with respect to a plane extending orthogonally to the longitudinal axis 23 of the body 12 and passing through the center of the terminal disc 14. As shown, the angle, α, is acute and relatively small, however, it may be larger or smaller. Because of this angle α, the external periphery of the terminal disc 14 and the central opening of the disc which surrounds the body 12 are not circular, but are elliptical, whereby the distance between the rotational axis of the body 12 and the periphery of the terminal disc 14 is constant. As a result, there is a constant distance between the bottom of the harvesting front attachment 24 (FIG. 2) and the terminal disc 14 when the disc is being rotated. Conceivably, however, the configuration of the periphery of the terminal disc 14 may be different such that this distance varies.

Figure 2:
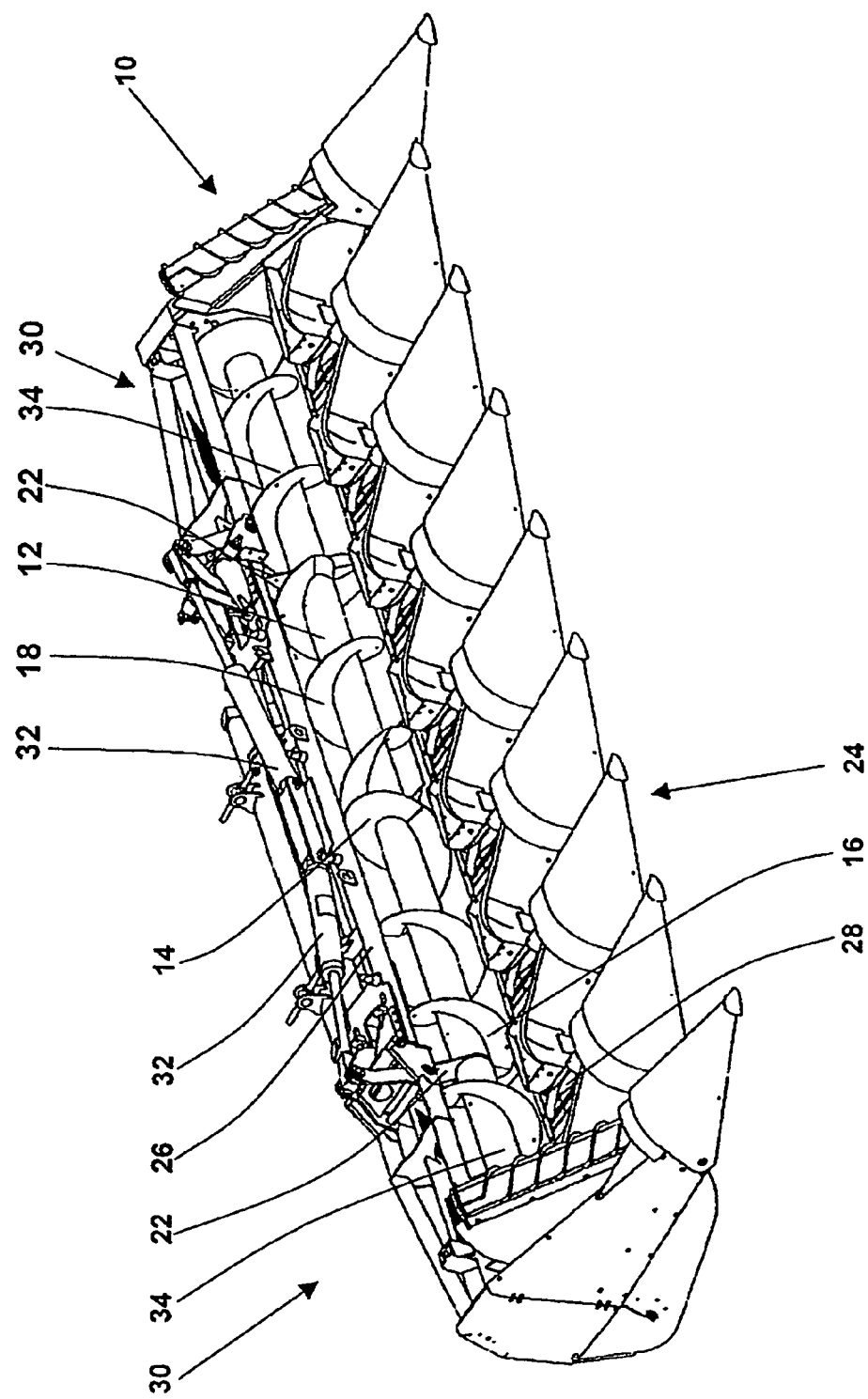
FIG. 2 is a corn plucker equipped with a transverse conveying screw according to FIG. 1.

FIG. 2 illustrates a harvesting front attachment 24 in the form of a corn plucker and having the transverse conveying screw 10 of the present invention. The front attachment 24 has a frame 26 with eight receiving and plucking devices 28 distributed over its front region. When operating in harvesting mode, the receiving and plucking devices 28 separate the parts of the plant to be harvested (i.e. the ears of corn) from the remainder of the plant, and chop the stems and deposit the stems on the field. The ears of corn are engaged by the transverse conveying screw 10 which is rotated around its longitudinal axis, and are conveyed toward the center of the harvesting front attachment 24. The inclined conveyor of a thresher harvester is disposed at the rear of the front attachment 24. Side parts 30 are provided at the two sides of the harvesting front attachment 24. For traveling, these side parts 30 can be swung upward by means of hydraulic cylinders 32. The side parts 30 have transverse conveying screw segments 34 which in their operating position (as illustrated) adjoin the screw body 12, and during operation they are connected to the screw body 12 in a manner which transmits torque.

An effect of the transverse conveying screw 10 with the central terminal disc 14 and adjoining screw elements 16, 18 on each respective side is that one avoids having an excessively large portion of the crop material being released in the center of the inclined conveyor. A substantial portion is released appreciably rightward and leftward of the center (with respect to the forward direction of the harvesting front attachment 24), whereby the thresher harvester is loaded in an approximately uniform manner. Also, the terminal disc 14 prevents accumulations of plant material at the ends of the screw elements 16, 18. In harvesting operation, when the body 12 is rotating around its longitudinal axis, the angle, α, results in a wobbling effect of the terminal disc 14, such that the disc 14 sweeps over successively different parts of the bottom of the harvesting front attachment 24 and sweeps past successively different parts of the intake channel of the harvesting machine disposed behind the harvesting front attachment 24. In contrast to the situation with known, radially extending terminal discs, there is no region in which the terminal disc 14 does not convey crop material. This feature appreciably improves the conveying of crop material.

Figure 3:
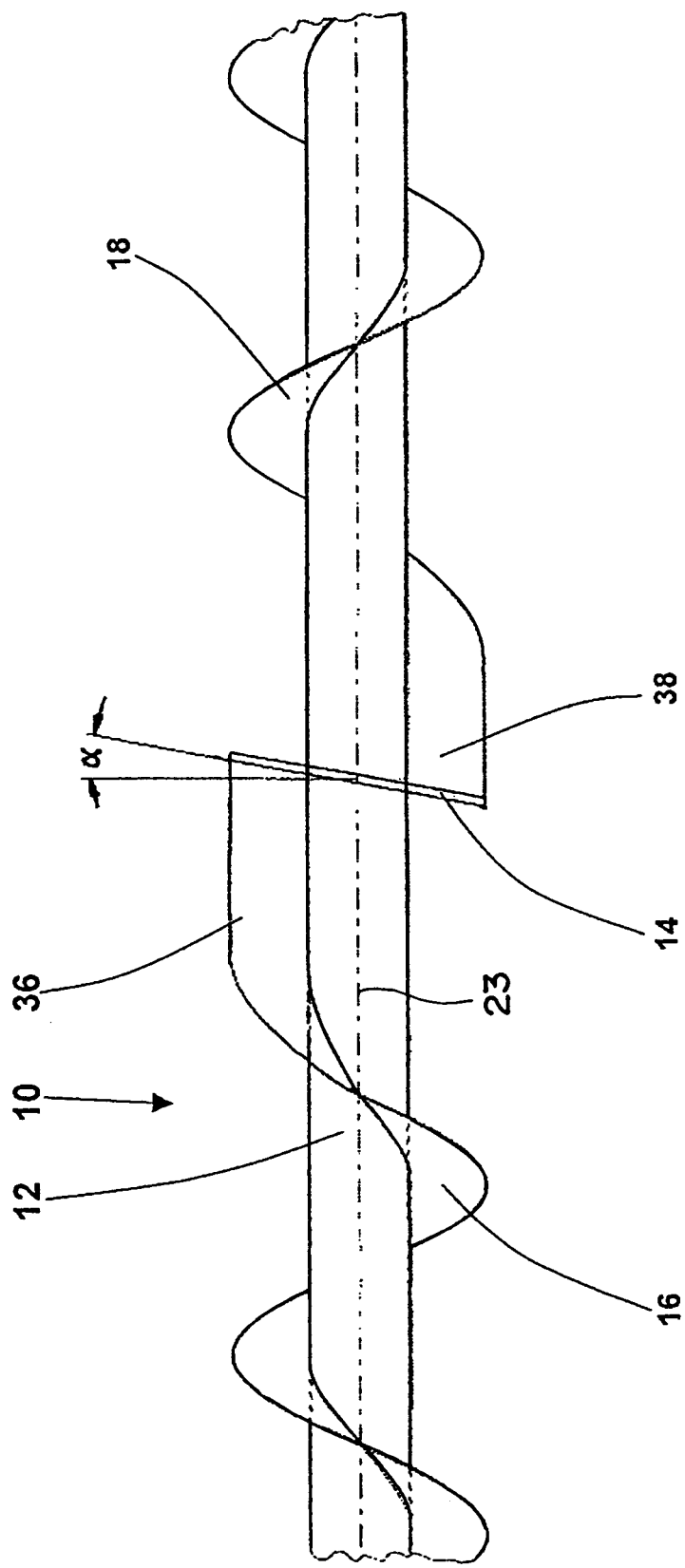
FIG. 3 is a plan view of an alternative embodiment of the transverse conveying screw.
Figure 4:
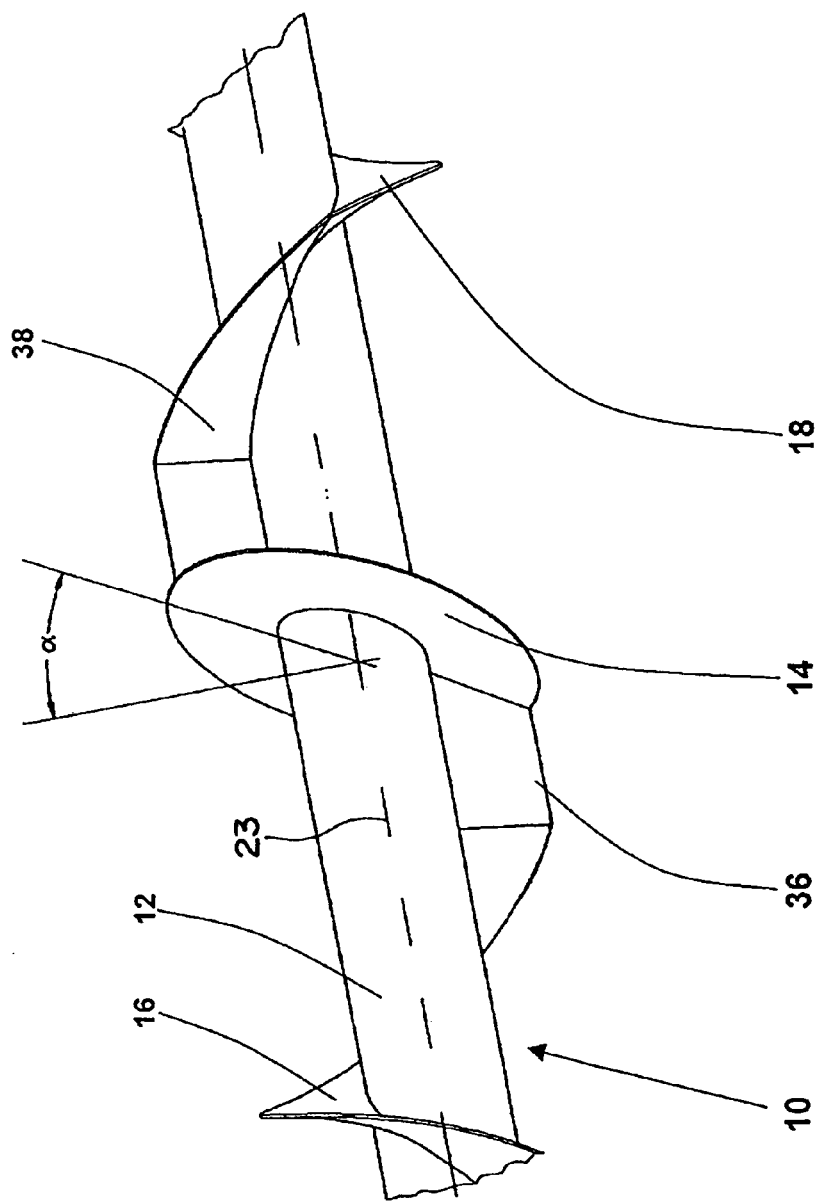
FIG. 4 is a perspective view of the transverse conveying screw shown in FIG. 3.

In FIGS. 3 and 4, an alternative embodiment of the transverse conveying screw 10 is illustrated, which also can be employed in a harvesting front attachment 24 configured generally according to FIG. 2. The same reference numerals have been retained to designate components which correspond to those in the embodiment shown in FIG. 1. The transverse conveying screw 10 according to FIG. 3 differs from the embodiment according to FIG. 1 essentially in that the screw elements 16, 18 end at a certain distance from the terminal disc 14, and at a location where they end they are respectively joined to rectangular conveying sections 36 and 38 which extend radially and axially with respect to the body 12. These conveying sections 36, 38 reduce movement of the crop material toward the center of the harvesting front attachment 24 and favor movement rearward into the harvesting machine. These conveying sections 36, 38 may alternatively have a spiral configuration (may be screw elements) having a greater pitch (longer distance between loops) and/or a lower height above the body 12 than the outer screw elements 16, 18. In this embodiment, the radial distance between the axis 23 of the body 12 and an outer edge of each of the conveying sections 36, 38 is approximately the same as the outer radius of each of the screw elements 16, 18 and the terminal disc 14.

In accordance with the provisions of the patent statutes, the present invention has been described in what is considered to represent its preferred embodiment. However, it should be noted that the invention can be practiced otherwise than as specifically illustrated and described. It is therefore intended that the foregoing detailed description be regarded as illustrative rather than limiting, and that it be understood that it is the following claims, including all equivalents, that are intended to define the spirit and scope of this invention.

What is claimed is:

1. A transverse conveying screw for a harvesting front attachment comprising:

a cylindrical body having a longitudinal axis and having first and second ends and a center;

first and second screw elements disposed around the body and respectively extending towards said center from said first and second ends a ring-shaped terminal disc disposed between the screw elements, the terminal disc lying in a plane oriented at an angle, α, with respect to a plane extending orthogonally to a longitudinal axis of the body and being dimensioned such that an outer diameter of said disc is approximately equal to an outer diameter of each of said screws; and said first and second screw elements respectively having first and second inner ends being one of joined directly to said disc or respectively joined indirectly to said disc by first and second axially extending conveying sections which extend parallel to said longitudinal axis of said body and radially from said axis at a distance approximately equal to an outer radius of each of said screw elements.

2. The transverse conveying screw according to claim 1, wherein the angle, $\alpha$, is an acute angle.

3. The transverse conveying screw according to claim 1, wherein the terminal disc includes an elliptical periphery.

4. The transverse conveying screw according to claim 1 wherein a distance defined between the longitudinal axis of the body and a periphery of the terminal disc is constant over the entire periphery of the terminal disc.

5. The transverse conveying screw according to claim 1, wherein the screw elements each adjoin the terminal disc at an edge that extends approximately radially to the body.

6. The transverse conveying screw according to claim 1, wherein an effective outer diameter of the screw elements is equal to an effective outer diameter of the terminal disc.

* * * * *